(12) United States Patent
Jang et al.

(10) Patent No.: US 7,457,629 B2
(45) Date of Patent: Nov. 25, 2008

(54) METHOD AND SYSTEM FOR REPORTING THE STATUS OF NON-EMERGENCY-SERVICES POSITION-DETERMINATION CAPABILITY

(75) Inventors: Ke-Chi Jang, Plano, TX (US); Robert E. "Woody" Denman, Plano, TX (US); Chung-Ching Wang, Plano (TW)

(73) Assignee: Nortel Networks Limited, St. Laurent Quebec (CA)

( * ) Notice: Subject to any disclaimer, the term of this patent is extended or adjusted under 35 U.S.C. 154(b) by 563 days.

(21) Appl. No.: 10/774,672

(22) Filed: Feb. 9, 2004

(65) Prior Publication Data

US 2004/0162052 A1  Aug. 19, 2004

Related U.S. Application Data

(63) Continuation of application No. 60/447,391, filed on Feb. 14, 2003.

(51) Int. Cl.
*H04Q 7/20* (2006.01)
(52) U.S. Cl. ............ 455/456.3; 455/456.1; 455/456.2; 455/414.2; 455/404.2; 455/433; 455/411; 455/432.3; 455/457
(58) Field of Classification Search .............. 455/456.3, 455/456.1, 456.2, 414.2, 404.2, 433, 411
See application file for complete search history.

(56) References Cited

U.S. PATENT DOCUMENTS

| | | | |
|---|---|---|---|
| 6,002,936 A | 12/1999 | Roel-Ng et al. | |
| 6,311,069 B1 * | 10/2001 | Havinis et al. | 455/456.4 |
| 6,675,017 B1 * | 1/2004 | Zellner et al. | 455/456.1 |
| 2002/0077116 A1 | 6/2002 | Havinis et al. | |
| 2002/0173317 A1 * | 11/2002 | Nykanen et al. | 455/456 |
| 2003/0008672 A1 | 1/2003 | Fuji | |

OTHER PUBLICATIONS

TIA/EIA IS-801-1 (3GPP2 C.S0022-0), 3$^{rd}$ Generation Partnership Project 2 "3GPP2", "Positioning Determination Service Standard for Dual Mode Spread Spectrum Systems", Version 3.0, Feb. 16, 2001, 146 pages.
3GPP2 C.S0022-A, 3$^{rd}$ Generation Partnership Project 2 "3GPP2", "Position Determination Service for cdma2000 Spread Spectrum Systems", Version 1.0, Mar. 2004, 293 pages.

* cited by examiner

*Primary Examiner*—Charles N Appiah
*Assistant Examiner*—Randy Peaches
(74) *Attorney, Agent, or Firm*—Haynes and Boone LLP

(57) ABSTRACT

A wireless communication system including a station having communication software for: (1) receiving a capability request from each of a plurality of non-emergency-service-providers, and (2) generating and transmitting a capability request response that includes a status indicator of a non-emergency-services position-determination (NESPD) capability of the station, wherein the NESPD capability of the station is user-selectable to enable or disable all NESPD irrespective of which of the plurality of non-emergency-service-providers is associated with the capability request. Additionally, a method of operating an element of a wireless communication network, comprising: (1) exchanging NESPD messages with a mobile station; (2) receiving a status indicator from the mobile station, at least indirectly, the status indicator indicating that the mobile station is configured to refrain from providing position information for non-emergency-services; and (3) preventing a plurality of NESPD messages from being transmitted to the mobile station in response to receiving the status indicator.

14 Claims, 2 Drawing Sheets

METHOD AND SYSTEM FOR REPORTING THE STATUS OF NON-EMERGENCY-SERVICES POSITION-DETERMINATION CAPABILITY

CROSS REFERENCE

The present disclosure claims priority from U.S. Provisional Patent Application Ser. No. 60/447,391, filed on Feb. 14, 2003, which is hereby incorporated by reference.

BACKGROUND

The present disclosure relates generally to wireless communication networks and, more specifically, to a method and system whereby a wireless mobile device may report the status of a non-emergency-services position-determination (NESPD) capability, wherein the NESPD capability is user-selectable.

Location based services (LBSs) are increasingly important across wireless networks. Generally, there are two classes of LBSs: emergency services (ES), and value-added services (VASs). Emergency services may be used, for example, to locate a mobile phone user who places a call for emergency services. VASs may be commercial services such as navigational services, store location services, or locate-me services. Through known location services (LCS) techniques, it is possible for a wireless network and wireless mobile device to provide a location (e.g. latitude and longitude) and location-related information to an LBS provider.

In some instances, the wireless mobile device may be configured to disregard LCS requests for all but ES. The wireless mobile device may be configured not to respond to VAS-related requests, or to respond, but without the requested location data, and possibly with a general-purpose reject reason. This may result in the network repeatedly sending LCS requests for VASs to the wireless mobile device since the network and/or VAS provider have no way to know exactly why the wireless mobile device is not responding to a request. The wireless mobile device has no way to unambiguously inform the network that it will only respond with LCS data to ES-related LCS requests.

Accordingly, what is needed is system and method of use thereof that addresses the issues discussed above.

SUMMARY

The present disclosure introduces a computer data signal including a plurality of wireless mobile device native capability data (NCD) and a status indicator of a non-emergency-services position-determination (NESPD) capability. The NESPD capability is user-selectable. The NCD may include one or more of a GPS acquisition capability indicator, a position calculation capability indicator, a wireless mobile device location standard revision number indicator, a wireless mobile device digital mode indicator, and a wireless mobile device pilot phase capability indicator.

A wireless communication system is also provided in the present disclosure. In one embodiment, the system includes first and second stations having first and second communication software, respectively. The first communication software may be configured to generate and transmit a capability request. The second communication software may be configured to receive the capability request and to generate and transmit a capability request response that includes a status indicator of a non-emergency-services position-determination (NESPD) capability, wherein the NESPD capability is user-selectable.

The present disclosure also introduces a method of communicating between telecommunications network stations. In one embodiment, the method includes generating a capability request at a first station and transmitting the capability request to a second station, which receives the capability request. The capability request may comprise or be contained in a position determination data message (PDDM). A capability request reply, which may also comprise or be contained in a PDDM, is generated in response to the capability request at the second station, wherein the capability request reply includes a status indicator of a non-emergency-services position-determination (NESPD) capability of the second station, the NESPD capability being user-selectable. The capability request reply may also be transmitted before, or without, the capability request. The capability request reply is transmitted to and received at the first station.

The foregoing has outlined features of several embodiments so that those skilled in the art may better understand the detailed description that follows. Additional features will be described below that further form the subject of the claims herein. Those skilled in the art should appreciate that they can readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
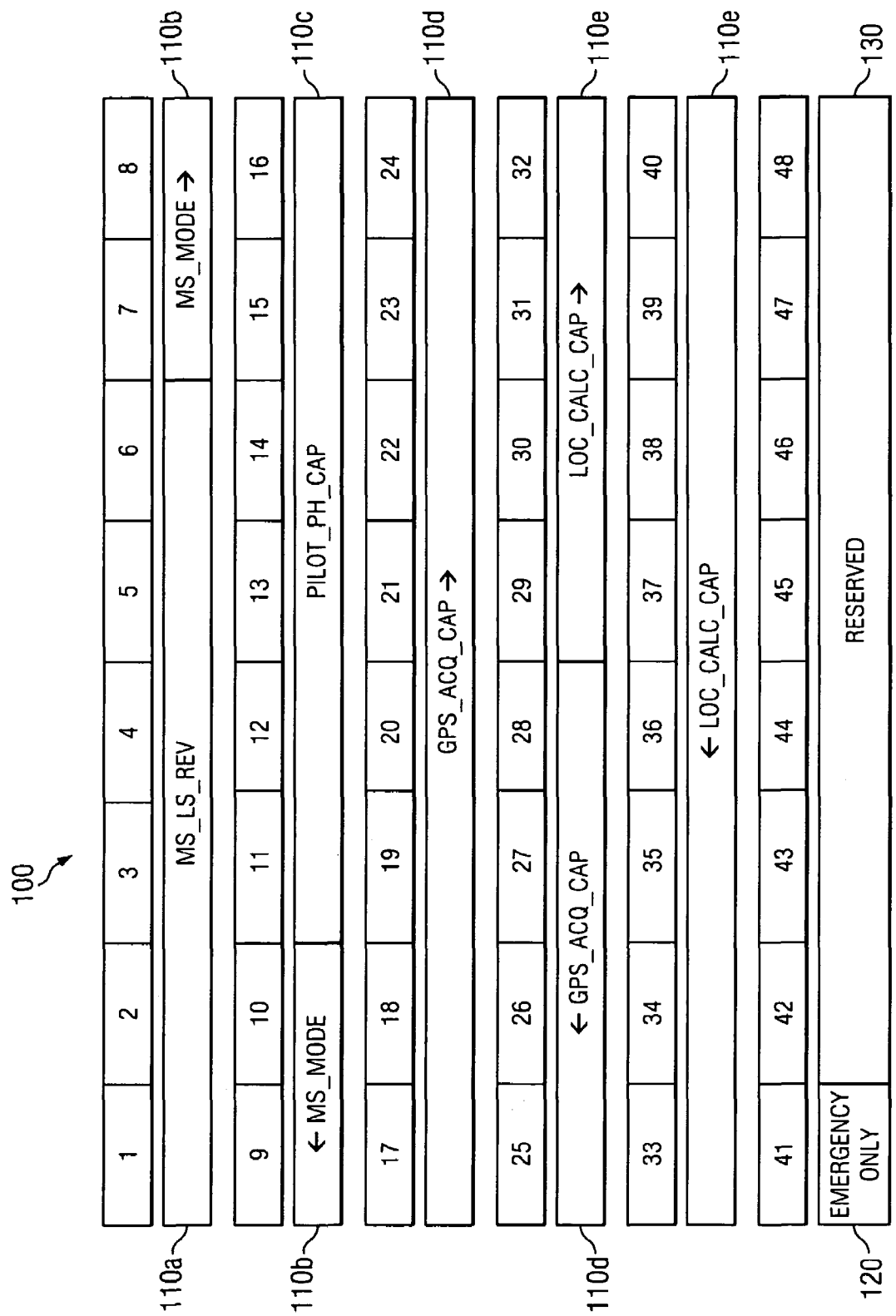
FIG. 1 illustrates a block diagram of one embodiment of a capability request response according to aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure is related to and hereby incorporates in its entirety, Position Determination Service Standard for Dual Mode Spread Spectrum Systems, Addendum 1, TIA/EIA IS-801-1, Telecommunications Industry Association (March, 2001).

As described above, situations exist in which it is necessary or desired to determine the physical location of a wireless mobile device, such as a mobile phone, a wireless-enabled PDA, etc. For example, if a mobile phone user places a call to a police department, it may be necessary for the police department to locate the mobile device user without requiring the user to provide spoken directions. Non-emergency services may also make use of the capability to determine the position of wireless mobile devices. For example, a mobile phone user may wish to wirelessly receive directions to the nearest ATM, movie theater, restaurant, etc., without keying in the user's current location. Thus, a wireless network may be enabled to send requests to a wireless mobile device within the network (or other networks) to provide information detailing the physical location of the mobile device (e.g., latitude/longitude coordinates, etc.).

However, a wireless mobile device user may also enable or disable their mobile device from automatically responding to such external requests for location information. For example, a user may disable their wireless device from transmitting location information to all requesters except emergency services providers (e.g., police and fire departments). When a mobile device has been disabled from providing location information to a non-emergency service provider, requests for location information from non-emergency service providers may nevertheless be sent to the mobile device. However, the non-emergency service provider requesting the location information will not receive the requested location information from the mobile device. Of course, the non-emergency service provider may continue to receive other messages from the mobile device not pertaining to the specific location of the mobile device. Thus, the non-emergency service provider may continue to request location information, possibly assuming that previous request for location information were corrupted, blocked, or otherwise errant.

The present disclosure, however, provides for informing the non-emergency services provider that non-emergency position-determining capabilities of the mobile device have been disabled. Thus, the non-emergency service providers may cease the repeated requests for location information from the mobile device. Consequently, the non-emergency service providers may be able to limit over-the-air data traffic in cases where a mobile device has position-determining capabilities but the mobile device user has chosen to disable position-determining capabilities for location information requests from non-emergency service providers.

Referring to FIG. 1, illustrated is a block diagram (or bit map) of one embodiment of a capability request response 100 according to aspects of the present disclosure. The response 100 may be a message generated and/or transmitted by a wireless mobile device or other telecommunications network element, possibly in response to a capability request message received from another telecommunications network element, such as one including a position determining entity (PDE). The response 100 may be part of a position determination data message (PDDM), as in IS-801-1.

The response 100 may include a plurality of wireless mobile device native capability data (NCD 110a-e, collectively) and a status indicator 120 of a non-emergency-services position-determination (NESPD) capability. Each of the NCD 110a-e may have values that are predetermined. The NCD 110a-e may be set by the OEM, they may be hardware-specific, and/or they may depend upon the network or signal strength where the wireless mobile device is located. The NCD 110a-e may be stored within a nonvolatile memory of a wireless mobile device. The NCD 110a-e are not user selectable. The status indicator 120 indicates a user-selectable preference for providing position information for ES but not for VASs. The status indicator 120 may be modified by a user's interaction with the machine-human interface of a wireless mobile device as will be explained below.

In the illustrated embodiment, the response 100 includes a wireless mobile device location standard revision indicator (MS_LS_REV) 110a, a wireless mobile device digital mode indicator (MS_MODE) 110b, and a wireless mobile device pilot phase capability indicator (PILOT_PH_CAP) 110c. Other examples of NCD in the illustrated embodiment include a GPS acquisition capability indicator (GPS_ACQ_CAP) 110d and a position calculation capability indicator (LOC_CALC_CAP) 110e.

The MS_LS_REV 110a may indicate the wireless mobile device location standard revision being used by the wireless mobile device. For example, IS-801-1 may be used by the wireless mobile device, which may correspond to a value in the MS_LS_REV 110a of '000001'. In such case, the MS_LS_REV 110a field may be set to '00001' and may not be changeable by a wireless mobile device user. In the illustrated embodiment, the MS_LS_REV 110a has a length of 6 bits, although other lengths are within the scope of the present disclosure.

The MS_MODE 110b may indicate the digital mode of the wireless mobile device. If, for example, the wireless mobile device operates under the IS-801-1 protocol, this field may have the value of '0000'. MS_MODE 110b is based on the wireless mobile device and is not changeable by the user. In the illustrated embodiment, the MS_MODE 110b has a length of 4 bits, although other lengths are within the scope of the present disclosure.

The PILOT_PH_CAP 110c may be used to store the pilot phase capability of the wireless mobile device. Specified values for the PILOT_PH_CAP 110c field may be based upon the capability of the wireless mobile device. For example, in the IS-801-1 standard, the values '000000', '000001', '000010', '000011', and '000100' correspond to full chip measurement capability, half chip measurement capability, quarter chip measurement capability, eighth chip measurement capability, and one sixteenth chip measurement capability, respectively. The remaining possible values of PILOT_PH_CAP 110c may be reserved for future use. The value taken by PILOT_PH_CAP 110c may be hardware dependent and hence not selectable or changeable by the wireless mobile device user. In the illustrated embodiment, the PILOT_PH_CAP 110c has a length of 6 bits, although other lengths are within the scope of the present disclosure.

The GPS_ACQ_CAP 110d may correspond to the Global Positioning System (GPS) acquisition capability of the wireless mobile device. Each bit in the GPS_ACQ_CAP 110d field may represent one of several GPS acquisition capabilities. For example, if, as in the IS-801-1 standard, the GPS_ACQ_CAP 110d field has a total of 12 bits, bits 1-7 may correspond to GPS acquisition assistance, GPS sensitivity assistance, GPS almanac, GPS ephemeris, GPS navigation message bits, GPS almanac correction, and GPS autonomous acquisition capable, respectively. Bits 8-12 may be reserved. The GPS_ACQ_CAP 110d field may correspond to the hardware capabilities of the wireless mobile device such that they are not user selectable or changeable. In the illustrated embodiment, GPS_ACQ_CAP 110d has a length of 12 bits, although other lengths are within the scope of the present disclosure.

The LOC_CALC_CAP 110e field may be set to indicate the position calculation capability of a wireless mobile device. Each bit in the LOC_CALC_CAP 110e field may correspond to one of several position calculation capabilities.

For example if, as in IS-801-1, the LOC_CALC_CAP 110*e* field has a total of 12 bits, bits 1 and 2 may correspond to a wireless mobile device being location calculation capable using spherical location assistance and Cartesian location assistance, respectively. Bit 3 may correspond to advanced forward link trilateration (AFLT) location calculation capability. Bits 4-6 may correspond to location calculation capable using GPS almanac assistance, GPS ephemeris assistance, and GPS almanac correction, respectively. Bit 7 may correspond to the wireless mobile device being autonomous location calculation capable, while bit 8 may indicate hybrid GPS and AFLT location calculation capability. Bits 9-11 may be reserved and bit 12 may be used to indicate a pre-programmed location capability. In the illustrated embodiment, the LOC_CALC_CAP 110*e* has a length of 12 bits, although other lengths are within the scope of the present disclosure.

The EMERGENCY_ONLY status indicator 120 indicates the status of the NESPD capability of the wireless mobile device or other applicable telecommunications network element. The EMERGENCY_ONLY status indicator 120 indicates a user-preference to refrain from providing position information for VASs although capability for providing position information for EMERGENCY services may remain active. The wireless mobile device may support various LCS capabilities, as described above, and may relay such capabilities to another station in the network, such as a BTS or a PDE, by transmitting the NCD 110*a-e*. The user may disable the LCS capabilities of the wireless mobile device for all but EMERGENCY SERVICES LBSs. If so, the user may also wish to inform a PDE that the LCS capabilities of the wireless mobile device have been disabled for all but EMERGENCY SERVICES LBSs. The user of the wireless mobile device may do so by setting the EMERGENCY_ONLY 120 status indicator to true. When following the IS-801-1 standard conventions, true corresponds to a value of '1' while false corresponds to a value of '0'. In this embodiment, the EMERGENCY_ONLY 120 status indicator comprises a single bit. However, in some embodiments more bits may be used. For example, one or more of the reserved bits 130 could be used for the EMERGENCY_ONLY 120 status indicator.

The user may set the EMERGENCY_ONLY 120 indicator to true manually, or it may be automatically set to true by the wireless mobile device when VAS LBSs are disabled. The user may select the value of EMERGENCY_ONLY 120 when the wireless mobile device is in use, when the wireless mobile device is idle, or at startup. A default value may be set by the user, to which the stored EMERGENCY_ONLY 120 bit always resets during power up, or power down. The user may also be able to associate a stored EMERGENCY_ONLY 120 value with a profile for the wireless mobile device. For example, EMERGENCY_ONLY indicator may be set to a particular stored value when the wireless mobile device leaves a certain area, or during certain hours. As another example, the mobile user may wish to allow VAS LBSs only when in a home city and during business hours. Other user defined events corresponding to a change in the value of the stored EMERGENCY_ONLY 120 status indicator are also possible.

Figure 2:
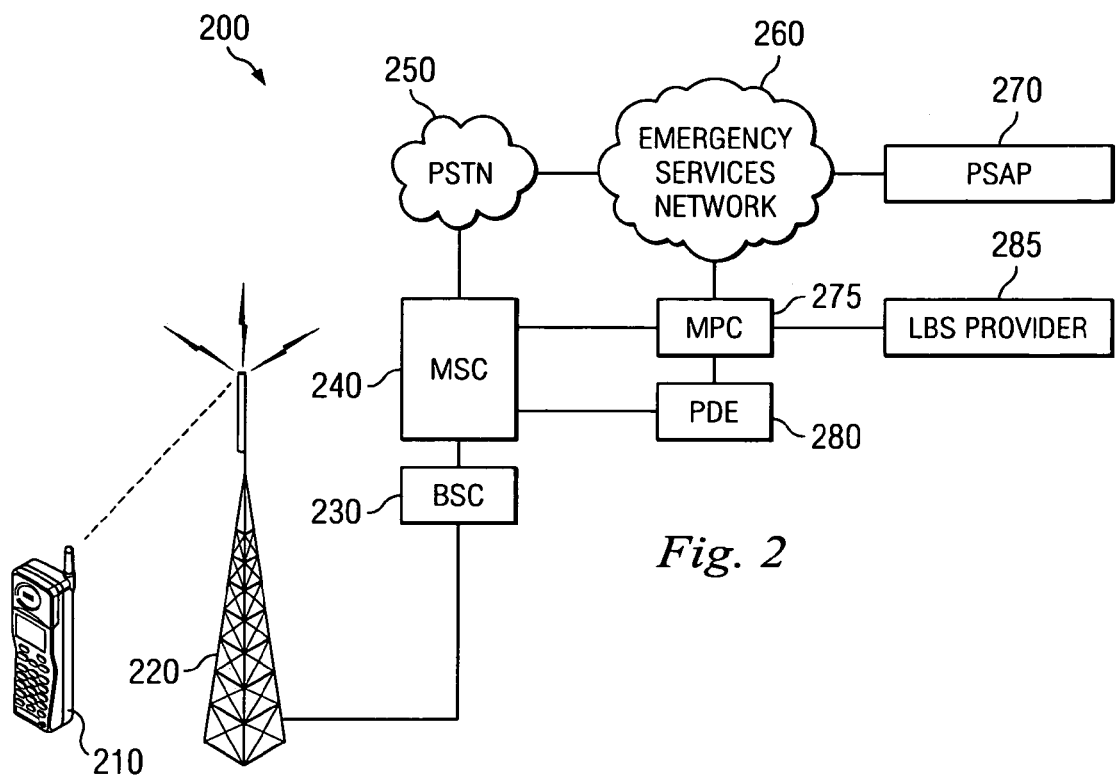
FIG. 2 illustrates a block diagram of one embodiment of a telecommunications network according to aspects of the present disclosure

FIG. 2 illustrates a block diagram of one embodiment of a wireless telecommunications network 200 according to aspects of the present disclosure. The telecommunications network 200 is one environment in which the response 100 shown in FIG. 1 may be employed.

The telecommunications network 200 includes a wireless mobile device 210 that may be in communication with a base transceiver station or system (hereafter collectively referred to as "BTS") 220. The BTS 220 may be part of a base station (BS), which may comprise other BTSs (not shown) and a base station controller (BSC) 230. The BTS 220 may be controlled by the BSC 230, which may in turn be controlled by a mobile switching center (MSC) 240. The MSC 240 may receive calls from, or route calls to, a public switched telephone network (PSTN) 250. An emergency services network 260 may interact with the PSTN 250 and also connect to a public safety answering point (PSAP 270) and a mobile positioning center (MPC) 275. The MPC 275 may communicate with MSC 240, and may operate to locate wireless mobile device 210 through position determining entity (PDE) 280. VAS provider 285 may also locate wireless mobile device 210 through the MPC 275 and PDE 280.

The wireless mobile device 210 may comprise a cellular telephone, a PDA, a pager, a personal computer with a wireless modem, an onboard vehicle computer, or another device for which location data may be desired. Here, only a single wireless mobile device 210 is shown although there may be many more in the same telecommunications network 200. The wireless mobile device may be in communication with the BTS 220. Here again, only a single BTS 220 is shown but the telecommunications network 200 may include many. In another embodiment, the wireless mobile device 210 may be in communication with multiple BTSs and possibly other wireless mobile devices. The wireless mobile device 210 may communicate with the BTS 220 using various wireless protocols. For example, the protocol be may related to, but is not limited to, CDMA, 1xRTT, TDMA, analog (e.g., AMPS), FDMA, GSM, UMTS, Bluetooth, or Wi-Fi.

The BTS 220 may be operated or controlled by BSC 230. The BSC 230 may control multiple BTSs and may control how wireless mobile devices are allocated to the multiple BTSs and how the wireless mobile devices are handed-off between the BTSs. There may be multiple BSCs within the network 200 although only one is shown here.

The BSC 230, and possibly others, may be in communication with the MSC 240. The MSC 240 may be a single element, or a network of elements, that routes calls and information to and from the BSC 230, or to other network elements. There may also be multiple MSCs within a network. The MSC 240 may connect the wireless portion of the telecommunications network 200 to the PSTN 250. The PSTN 250 may be an ordinary public switched telephone network. The PSTN 260 may be connected to an emergency services network 260, such as that used to report fires or call the police. The emergency services network may connected to or integrated with a Public safety answering point (PSAP) 270. Emergency calls made by wireless mobile devices may be routed to or received by the PSAP 270. An operator on the PSAP may be able to obtain location information about the mobile wireless device 210 via the MPC 275 and the PDE 280. As previously described, a VAS provider 285 may provide LBSs to the wireless mobile device 210. The VAS provider may also obtain location information from the PDE 280 via the MPC 275.

To illustrate one embodiment of the present disclosure in operation, wireless mobile device 210 may register with the network 200, or originate a call, and advise the network 200 of its general latent LCS capabilities, possibly in associated IS-2000 signaling messages (IS-2000 referring to TIA/EIA/IS-2000.5.A-1, Upper Layer (Layer 3) Signaling Standard for cdma2000 Spread Spectrum Systems, Addendum 1, November, 2000). If wireless mobile device 210 indicates support for the IS-801-1 protocol, the PDE 280 may establish a session with the wireless mobile device 210 for the exchange of application layer protocols. The protocol messages may be exchanged between the wireless mobile device 210 and the PDE 280 in the form of position data determination messages (PDDMs). It is understood, however, that PDDMs may pass between other network elements such as the MSC 240 and BSC 230 in route between the PDE 280 and wireless mobile device 210. The PDDMs may each contain one or more request and/or response elements. The PDE 280 may send a PDDM containing an information or capability request element to the wireless mobile device 210 to determine its LCS capabilities. The wireless mobile device 210 may respond with a PDDM containing LCS capability information such as that described with respect to FIG. 1. In some instances the wireless mobile device 210 may send a PDDM with LCS capability information without first receiving a PDDM with a capability request.

To further illustrate, as previously described, the wireless mobile device 210 may have LCS capabilities that are native features of the device indicated by NCD 110a-e (of FIG. 1) in addition to an NESPD indicator 120. The user of the wireless mobile device 210 may have no current interest in any VAS LBSs. For example, the user may be traveling and have no interest in having the location of the wireless mobile device 210 tracked for the use of local advertisers. The user of the wireless mobile device 210 may set the EMERGENCY_ONLY indicator 120 to true to indicate that the NESPD capabilities of the wireless mobile device have been disabled by the user. This may be accomplished, for example, by selecting a profile (e.g. a traveling profile) on the mobile device 210, or by setting the EMERGENCY_ONLY 120 indicator to true through a manual interface on the wireless mobile device 210.

There may be a VAS provider 285 that wishes to advertise to all wireless mobile devices within a given radius of a specific advertiser. The PDE 280 may send a PDDM with an LCS request to the wireless mobile device 210. The request may be passed through the mobile switching center 240, to the base station controller 230, to the BTS 220, and wirelessly to the wireless mobile device 210.

The wireless mobile device 210 may be capable of responding with location data based on its native capabilities. However, the EMERGENCY_ONLY 120 indicator, having been set to true to indicate NESPD capability disablement by the wireless mobile device 210 user, will be sent back through the network, possibly with the NCD 110a-e, and possibly with an indication that an LCS request other than a capability request has been rejected, to the PDE 280. The PDE 280 will receive the message containing the EMERGENCY_ONLY 120 indicator with a value of true and may indicate to the VAS provider 285 that the wireless mobile device 210 will not respond with location information unless the LCS request is for an ES. In some cases, without first receiving a PDDM containing a request for LCS data, the wireless mobile device 210 may send a PDDM to the PDE 280 indicating that only ES-related LCS will be provided with location-related data.

Figure 3:
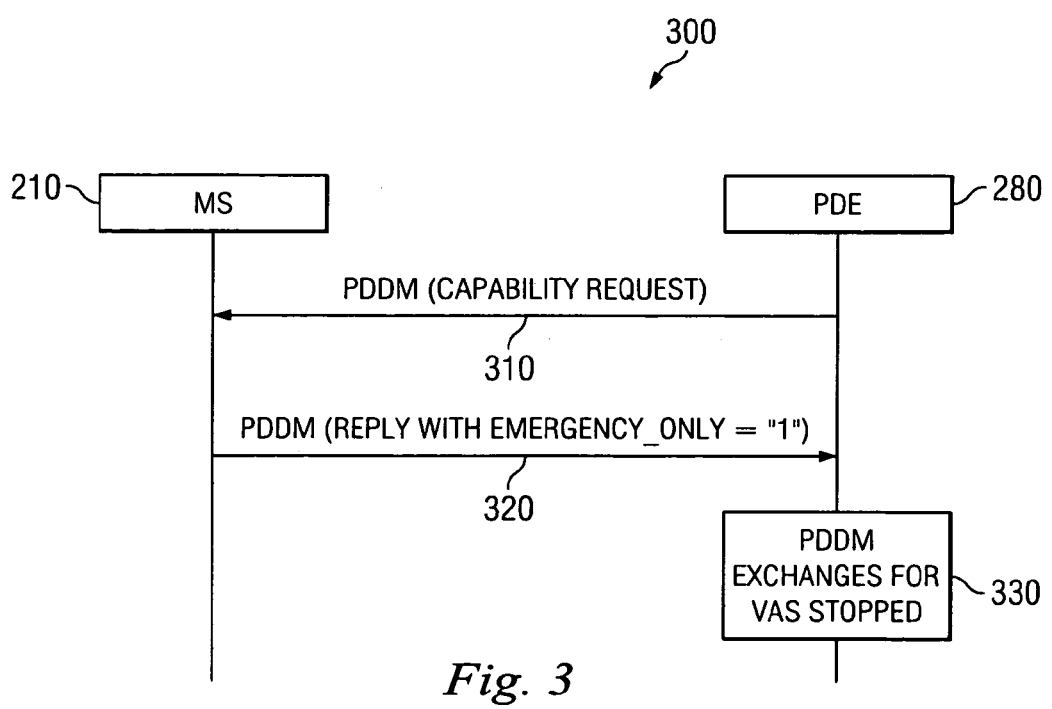
FIG. 3 illustrates a message sequence chart of one embodiment of a method of reporting the status of an emergency services position-determination capability according to aspects of the present disclosure

FIG. 3 illustrates a message sequence chart of one embodiment of a method 300 of reporting the status of a non-emergency-services position-determination (NESPD) capability according to aspects of the present disclosure.

A positioning determining entity (PDE) 280 may pass a PDDM comprising a capability request corresponding to a VAS to the wireless mobile device 210 at step 310. An NESPD capability request or other LCS request may be passed in the same PDDM. The PDDM 310 may be passed through other network elements (not shown), such as an MSC, a BSC, or a BTS, before reaching the wireless mobile device 210. If the wireless mobile device 210 is configured to respond with LCS data only for ES LBSs, the user may have already set the EMERGENCY_ONLY (120 of FIG. 1) indicator to true.

As described with reference to FIG. 1, the EMERGENCY_ONLY value may be sent back to the PDE 280 along with NCD 110a-e (FIG. 1). A PDDM 320 containing the EMERGENCY_ONLY value of '1', and possibly NCD 110a-e, may be sent to the wireless mobile device. The PDDM 320 may also pass through a other network elements (not shown), such as an MSC, a BSC, or a BTS, before reaching the PDE 280. Upon receiving the PDDM 320 with EMERGENCY_ONLY set to '1', the PDE 280 has thereby been informed that the wireless mobile device 210 will respond to LCS data requests only for ES LBSs. PDDMs requesting LCS data for non ES LBS providers may then be stopped at step 330. As described previously, the wireless mobile device 210 may also send the PDDM (reply with EMERGENCY_ONLY=1) 320 without first receiving the PDDM (capability request) 310 from the PDE 280.

Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A wireless communication system, comprising:
a station having communication software for:
receiving a capability request from at least one non-emergency-service-provider; and
generating and transmitting a capability request response to each requesting non-emergency-service-provider,
wherein the capability request response includes a status indicator of a non-emergency-services position-determination (NESPD) capability of the station,
wherein the status indicator comprises no more than eight data bits of the capability request response, and
wherein the NESPD capability of the station is user-selectable to enable or disable all NESPD irrespective of which non-emergency-service-provider is associated with the capability request.

2. The wireless communication system of claim 1 wherein the capability request response further includes at least one of a GPS acquisition capability indicator and a position calculation capability indicator.

3. The wireless communication system of claim 1 wherein the station is a first station and the communication software is first communication software, the wireless communication system further comprising a second station having second communication software for generating and transmitting the capability request.

4. The wireless communication system of claim 3 wherein the second station comprises a position determining element.

5. The wireless communication system of claim 1 wherein the station is a wireless mobile device.

6. The wireless communication system of claim 1 wherein the station is selected from the group consisting of: a cellular phone, a wireless enabled personal digital assistant, a wireless-enabled personal computer, a GPS device, and a pager.

7. The wireless communication system of claim 1 wherein the status indicator comprises one data bit of the capability request response.

8. A method of operating an element of a wireless communication network, comprising:
  receiving a status indicator from a mobile station, at least indirectly, wherein the status indicator indicates that the mobile station is configured to refrain from providing position information for non-emergency-services, and wherein the status indicator comprises no more than eight data bits of a capability request response; and
  preventing a plurality of non-emergency-services position-determination (NESPD) messages from being transmitted to the mobile station in response to receiving the status indicator.

9. The method of claim 8 further comprising receiving, at least indirectly, a message from a non-emergency-service-provider regarding a service that is dependent upon the mobile station's position within the wireless communication network.

10. The method of claim 8 wherein the status indicator indicates whether the mobile station is configured to:
  refrain from providing position information for all non-emergency-services; or
  provide position information for all non-emergency-services.

11. The method of claim 8 wherein the status indicator indicates whether the mobile station is configured to provide or refrain from providing position information for non-emergency-services in a manner independent of any particular non-emergency-service-provider.

12. The method of claim 8 wherein the element is a position determining entity.

13. The method of claim 8 wherein the status indicator is included in a message further containing native capability data of the mobile station.

14. The wireless communication system of claim 8 wherein the status indicator comprises one data bit of the capability request response.

* * * * *